United States Patent
Liu

(10) Patent No.: US 10,802,854 B2
(45) Date of Patent: Oct. 13, 2020

(54) METHOD AND APPARATUS FOR INTERPRETING BYTECODE INSTRUCTION STREAM

(71) Applicant: Alibaba Group Holding Limited, George Town (KY)

(72) Inventor: Xiaojian Liu, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/786,856

(22) Filed: Feb. 10, 2020

(65) Prior Publication Data

US 2020/0174810 A1    Jun. 4, 2020

Related U.S. Application Data

(63) Continuation of application No. PCT/CN2020/071560, filed on Jan. 11, 2020.

(30) Foreign Application Priority Data

Aug. 30, 2019    (CN) .......................... 2019 1 0818266

(51) Int. Cl.
*G06F 9/455* (2018.01)
*G06F 9/30* (2018.01)

(52) U.S. Cl.
CPC ...... *G06F 9/45508* (2013.01); *G06F 9/30003* (2013.01); *G06F 9/30145* (2013.01); *G06F 9/45533* (2013.01)

(58) Field of Classification Search
None
See application file for complete search history.

(56) References Cited

U.S. PATENT DOCUMENTS 6,021,273 A * 2/2000 Griesemer ............... G06F 8/30
 717/118
6,256,784 B1 7/2001 Grove
(Continued)

FOREIGN PATENT DOCUMENTS

CN    1222985    7/1999
CN    1484787    3/2004
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Isaac T Tecklu
(74) *Attorney, Agent, or Firm* — Fish & Richardson, P.C.

(57) ABSTRACT

Implementations of the present specification are provided for interpreting a bytecode instruction stream. An interpreter of a virtual machine receives an instruction stream comprising a plurality of machine instructions. A first value, comprising a current analog function address and stored in a first register corresponding to a current instruction of the plurality of machine instructions, is read. The validity of the first value is determined. If the first value is valid, the first value is stored in a second register configured to store current analog function addresses corresponding to current instructions in the instruction stream. A subsequent analog function address corresponding to a subsequent instruction associated with the current instruction is retrieved by using the current analog function address. The subsequent analog function address is stored in the first register. The current instruction is executed based on the current analog function address read from the second register.

20 Claims, 4 Drawing Sheets

(56) References Cited

U.S. PATENT DOCUMENTS

| | | | | |
|---|---|---|---|---|
| 6,332,215 | B1* | 12/2001 | Patel | G06F 9/30174 717/141 |
| 6,704,926 | B1* | 3/2004 | Blandy | G06F 9/45516 717/118 |
| 7,436,345 | B1* | 10/2008 | Provis | G06F 9/45508 340/12.22 |
| 2002/0066004 | A1* | 5/2002 | Nevill | G06F 9/30134 712/209 |
| 2003/0191792 | A1* | 10/2003 | Waki | G06F 9/30156 718/100 |
| 2004/0187099 | A1* | 9/2004 | Irwin | G06Q 30/04 717/136 |
| 2004/0210865 | A1* | 10/2004 | Shimura | G06F 8/41 717/100 |
| 2006/0101427 | A1* | 5/2006 | Yamada | G06F 9/30174 717/136 |
| 2009/0089550 | A1* | 4/2009 | Cabillic | G06F 11/3624 712/208 |
| 2013/0205115 | A1* | 8/2013 | Tabony | G06F 9/30054 712/204 |
| 2015/0317163 | A1 | 11/2015 | Stark | |
| 2017/0003941 | A1* | 1/2017 | Gschwind | G06F 8/54 |
| 2018/0117447 | A1* | 5/2018 | Tran | B33Y 10/00 |
| 2018/0276015 | A1* | 9/2018 | Yi | G06F 9/4552 |
| 2019/0056946 | A1* | 2/2019 | Gschwind | G06F 9/32 |
| 2019/0305957 | A1* | 10/2019 | Reddy | G06F 21/51 |
| 2019/0306173 | A1* | 10/2019 | Reddy | G06F 11/00 |
| 2020/0073693 | A1* | 3/2020 | Wallach | G06F 9/45558 |
| 2020/0073694 | A1* | 3/2020 | Wallach | G06F 9/45558 |
| 2020/0101367 | A1* | 4/2020 | Tran | G06F 3/011 |

FOREIGN PATENT DOCUMENTS

| | | |
|---|---|---|
| CN | 101295239 | 10/2008 |
| CN | 102292705 | 12/2011 |
| CN | 102893260 | 1/2013 |
| CN | 104679481 | 6/2015 |
| CN | 108984392 | 12/2018 |
| CN | 109416632 | 3/2019 |

OTHER PUBLICATIONS

Nakamoto, "Bitcoin: A Peer-to-Peer Electronic Cash System," www.bitcoin.org, 2005, 9 pages.

PCT International Search Report and Written Opinion in International Application No. PCT/CN2020/071560, dated Jun. 5, 2020, 17 pages (with machine translation).

* cited by examiner

METHOD AND APPARATUS FOR INTERPRETING BYTECODE INSTRUCTION STREAM

CROSS-REFERENCE TO RELATED APPLICATIONS

This application is a continuation of PCT Application No. PCT/CN2020/071560, filed on Jan. 11, 2020, which claims priority to Chinese Patent Application No. 201910818266.X, filed on Aug. 30, 2019, and each application is hereby incorporated by reference in its entirety.

TECHNICAL FIELD

One or more implementations of the present specification relate to the computer field, and in particular, to a method and an apparatus for interpreting a bytecode instruction stream.

BACKGROUND

A virtual machine (VM) is a complete computer system that is simulated by using software and that has a complete hardware system function and runs in an isolated environment. The VM can alleviate an impact on an upper-layer application from an underlying hardware platform and an operating system. In consideration of this, the VM can be well used to develop the upper-layer application. It is specific service logic instead of details about the underlying platform that requires attention during the development of the upper-layer application. After the development is completed, the VM runs the upper-layer application to convert code of the application into code executable to the underlying platform. In many scenarios, the upper-layer applications are written and developed by developers in high-level languages, and then are compiled into bytecodes by using a compiler. The bytecode is a binary file including an execution program and consisting of a sequence of operation codes (op code)/data pairs. The bytecode is a type of intermediate code. Then, an interpreter in the VM interprets an instruction stream represented by a bytecode.

For example, the VM can be deployed in each node on a blockchain network in a blockchain application scenario supporting a smart contract. For example, an Ethereum VM (EVM) is deployed in each node in the Ethereum. The user can write the smart contract in a high-level language. Then, the bytecode can be obtained through compiling by using a compiler. The bytecode is included in a transaction of creating the smart contract, and then is broadcasted to the blockchain network. In other words, the bytecode is deployed in each node on the blockchain network. When the smart contract needs to be executed, the EVM in each node interprets the bytecode.

In various application scenarios that include but are not limited to the blockchain application scenario, a speed at which the interpreter of the VM interprets the bytecode is critical to performance of an entire system. Therefore, an improved solution is expected to further improve efficiency of executing a bytecode instruction stream.

SUMMARY

One or more implementations of the present specification describe a method and an apparatus for interpreting a bytecode instruction stream. A function address of a subsequent instruction is pre-obtained when a current instruction is executed, and then is stored in a register, thereby improving efficiency of executing the bytecode instruction stream.

According to a first aspect, a method for interpreting a bytecode instruction stream. The method is executed by using an interpreter of a virtual machine and includes: reading a first value stored in a first register; when the first value is a valid value, storing the first value in a second register, where the second register is configured to store a current analog function address corresponding to a current instruction in the bytecode instruction stream; and obtaining, from a memory, a subsequent analog function address corresponding to a subsequent instruction of the current instruction, storing the subsequent analog function address in the first register, and executing the current instruction based on the current analog function address read from the second register.

In an implementation, the method further includes: when the first value is not a valid value, obtaining, from the memory, the current analog function address corresponding to the current instruction, and storing the current analog function address in the second register.

In an implementation, the subsequent analog function address is obtained by using the following method: determining an operation code corresponding to the subsequent instruction; and querying a mapping table stored in the memory to obtain the analog function address corresponding to the operation code.

Further, in an implementation, the operation code corresponding to the subsequent instruction is determined by using the following method: accumulating a program counter (PC) value of a PC by a value of the predetermined byte length to obtain a location number of the subsequent instruction; and querying, based on the location number, an instruction sequence table stored in the memory to obtain the operation code corresponding to the subsequent instruction.

In another implementation, the operation code corresponding to the subsequent instruction is determined by using the following method: determining an instruction length of the current instruction; accumulating a PC value of a PC by the instruction length to obtain a location number of the subsequent instruction; and querying, based on the location number, an instruction sequence table stored in the memory to obtain the operation code corresponding to the subsequent instruction.

In different implementations, the memory can be a cache or a computer memory. The querying a mapping table stored in the memory and/or the querying an instruction sequence table stored in the memory includes: conducting the query in the cache; or in cases of cache miss, conducting the query in the computer memory.

In an implementation, the executing the current instruction includes: determining whether an instruction stream sequence changes due to the current instruction; and in response to that the instruction stream sequence changes due to the current instruction, setting the value in the first register to an invalid value, and executing a current analog function corresponding to the current instruction; or in response to that the instruction stream sequence does not change due to the current instruction, directly executing a current analog function corresponding to the current instruction.

In an implementation, after the obtaining, from a memory, a subsequent analog function address corresponding to a subsequent instruction of the current instruction, the method further includes: determining, based on the subsequent analog function address, whether a subsequent analog function corresponding to the subsequent instruction is loaded into a cache; and in response to that the subsequent analog function corresponding to the subsequent instruction is not loaded into the cache, loading the subsequent analog function into the cache.

In an implementation, the bytecode instruction stream is a bytecode instruction stream obtained through compiling by using a smart contract, and the virtual machine is a WASM VM or a solidity VM.

According to a second aspect, an apparatus for interpreting a bytecode instruction stream is provided. The apparatus is disposed in an interpreter of a VM and includes: a reading unit, configured to read a first value stored in a first register; a storage unit, configured to: when the first value is a valid value, store the first value in a second register, where the second register is configured to store a current analog function address corresponding to a current instruction in the bytecode instruction stream; and an acquisition and execution unit, configured to obtain, from a memory, a subsequent analog function address corresponding to a subsequent instruction of the current instruction, store the subsequent analog function address in the first register, and execute the current instruction based on the current analog function address read from the second register.

According to a third aspect, a computer readable storage medium is provided. A computer program is stored in the computer readable storage medium. When the computer program is executed in a computer, the computer is enabled to execute the method in the first aspect.

According to a fourth aspect, a computing device is provided, including a memory and a processor. The memory stores an executable code. When the processor executes the executable code, the method in the first aspect is implemented.

According to the method and the apparatus provided in the implementations of the present specification, when an analog function corresponding to the current instruction is executed, the analog function address corresponding to the subsequent instruct is pre-obtained and then stored in the register. After the current instruction is executed, the analog function address required for the subsequent instruction can be directly read from the register, and then the subsequent instruction is executed. The CPU can rapidly access the register. Therefore, time consumed for executing the bytecode instruction stream can be greatly reduced in this way, thereby improving execution efficiency.

BRIEF DESCRIPTION OF DRAWINGS

To describe the technical solutions in the implementations of the present disclosure more clearly, the following briefly introduces the accompanying drawings needed for describing the implementations. Apparently, the accompanying drawings in the following description show merely some implementations of the present disclosure, and a person of ordinary skill in the art can still derive other drawings from these accompanying drawings without creative efforts.

DESCRIPTION OF IMPLEMENTATIONS

The following describes the solutions provided in the present specification with reference to the accompanying drawings.

Figure 1:
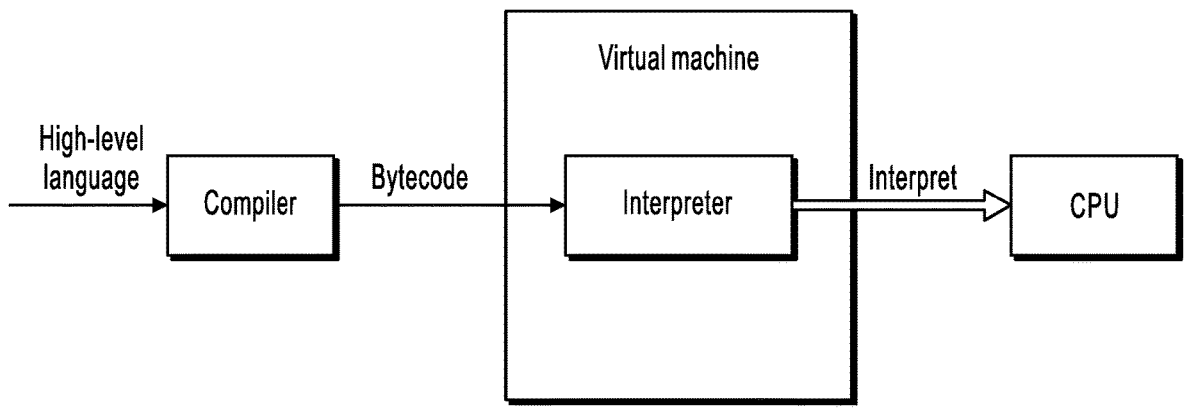
FIG. 1 is a schematic diagram illustrating an application scenario, according to an implementation.

FIG. 1 is a schematic diagram illustrating an application scenario, according to an implementation. As shown in FIG. 1, in a plurality of application scenarios, a program written in a high-level language is compiled into a bytecode file by using a compiler, and an instruction stream represented by the bytecode is interpreted by an interpreter of a virtual machine (VM). As such, the instruction stream is executed in a CPU.

Figure 2:
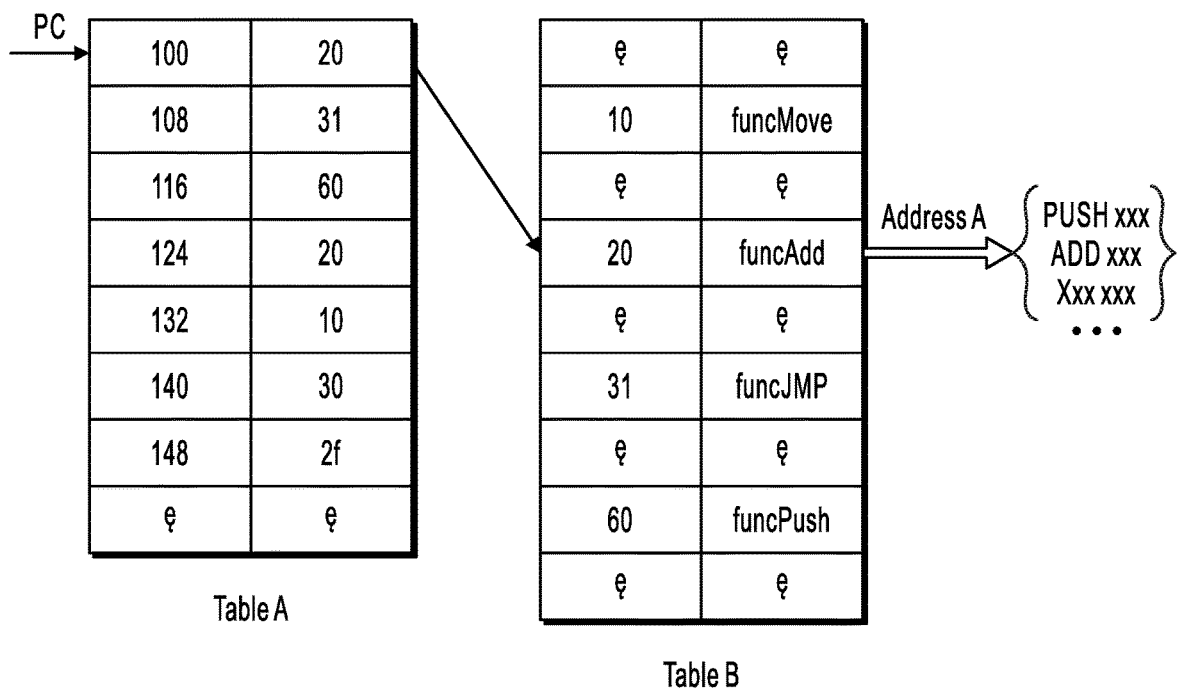
FIG. 2 is a schematic diagram illustrating a procedure of interpreting a bytecode instruction stream, according to an implementation.

FIG. 2 is a schematic diagram illustrating a procedure of interpreting a bytecode instruction stream, according to an implementation. As known to a person skilled in the art, before a bytecode file is executed, a virtual machine (VM) first loads the bytecode file into a computer memory and obtains an instruction sequence table shown in Table A in FIG. 2. In Table A, 100,108, etc. on the left side are location numbers, and 20, 31, etc. on the right side represent, for example, operation codes (op code). It can be seen that each operation code is a two-digit hexadecimal number with a length of one byte. It is also the reason why the operation code is referred to as a bytecode.

A program counter (PC) is used in the VM to record a location number of a currently executed instruction. A value of the PC is also referred to as a PC value. Therefore, based on Table A, when the PC value is 100, it indicates that an operation code 20 needs to be currently executed.

To execute an instruction indicated by an operation code, a mapping table shown in Table B needs to be queried. The mapping table shows an analog function corresponding to each operation code. For example, based on Table B, an operation code 10 corresponds to a MOVE function, an operation code 20 corresponds to an ADD function, and an operation code 31 corresponds to a JMP function. The mapping table in Table B is sometimes referred to as an instruction set, and is used to record a meaning (represented by using an analog function) of an operation instruction corresponding to each operation code. However, the mapping table does not record an instruction code included in the analog function, but records an address of the instruction code for storing the analog function. Therefore, an analog function address corresponding to an operation code currently to be executed can be obtained by querying Table B, and an instruction code of the analog function can be obtained through accessing based on the address. The instruction code of the analog function can be in a form suitable for execution performed by a machine. As such, an instruction represented by each operation code can be executed by executing the instruction code of the analog function.

With reference to a specific example, assuming that a current PC value is 100, it can be obtained based on Table A that an operation code 20 is currently to be executed in the bytecode instruction stream. Then, Table B is queried to obtain an analog function address corresponding to the operation code 20, and a code in an analog function is executed based on the address to execute a current instruction. Because the bytecode file is an instruction stream to be sequentially executed, the PC value accumulates in sequence except for several jump instructions. After an instruction at a location 100 is executed, the PC value accumulates to 108, and a subsequent instruction becomes an instruction currently to be executed. Correspondingly, it is obtained from Table A that an operation code in an instruction currently to be executed at the location number 108 is 31. Similarly, Table B is queried to obtain an analog function address corresponding to the operation code 31, and a code in an analog function is executed to execute the current instruction. Other cases are similar to the previous processes by analogy.

It can be seen from the previous process that a table query process needs to be performed at least twice each time an instruction is executed. To be specific, Table A is first queried based on the PC value to obtain an operation code to be executed; then, Table B is queried based on the operation code to obtain an analog function address corresponding to the operation code; and finally, the analog function can be executed.

It can be understood that Table A and Table B are at least stored in a computer memory after the VM loads the bytecode file. Further, at least one of Table A or Table B can also be stored in a cache based on a size of a cache in a CPU and frequency that Table A and Table B are accessed. In an instruction execution process, to query Table A and Table B, the CPU prioritizes and accesses the cache, and then accesses the computer memory in cases of cache miss. Currently, for most CPUs, more than 10 clock cycles are required for accessing an L1 cache, and more than 20 clock cycles are required for accessing an L2 cache; and more than 200 clock cycles are required for accessing the computer memory. Therefore, even if both Table A and Table B are stored in the L1 cache, it takes at least 20 clock cycles to query the two tables. However, in cases of cache miss when Table A or Table B is accessed, several hundreds of clock cycles are required for querying the tables in the computer memory.

In consideration of the time consumed for querying the tables, an implementation of the present specification provides an address acquisition solution. To be specific, when an analog function corresponding to a current instruction is executed, an analog function address corresponding to a subsequent instruct is pre-obtained and then stored in a register. After the current instruction is executed, the analog function address required for the subsequent instruction can be directly read from the register, and then the subsequent instruction is executed. The CPU can rapidly access the register (requiring only one clock cycle). Therefore, time consumed for executing a bytecode instruction stream can be greatly reduced in this way, thereby improving execution efficiency. The following describes an implementation of the inventive concept.

Figure 3:
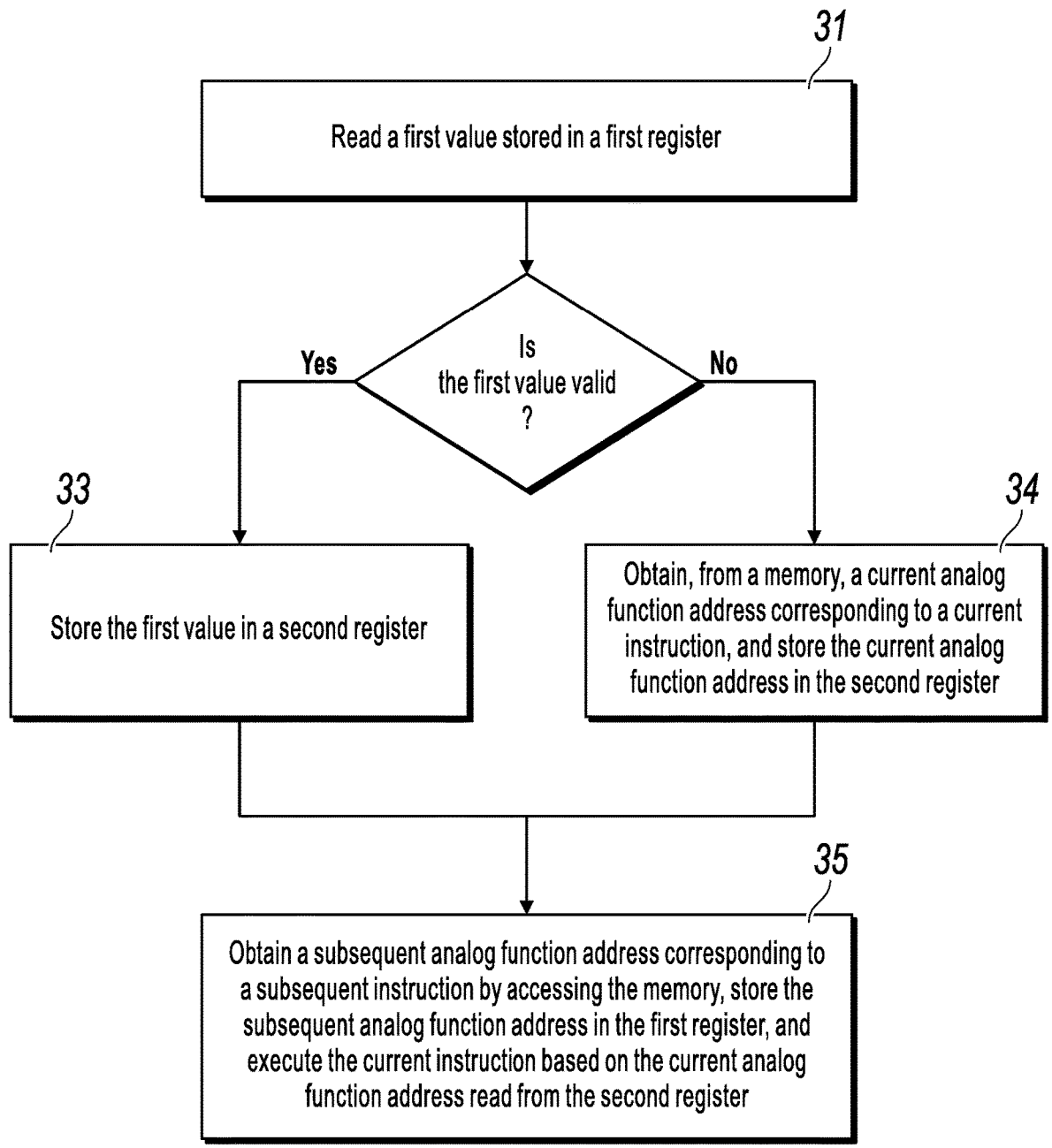
FIG. 3 is a schematic flowchart illustrating a method for interpreting a bytecode instruction stream, according to an implementation.

FIG. 3 is a schematic flowchart illustrating a method for interpreting a bytecode instruction stream, according to an implementation. It can be understood that the method can be executed by using an interpreter of a VM. The VM can be disposed in any apparatus, device, platform, or device cluster having computing and processing capabilities. In an implementation, the VM can be a generic VM, for example, a Java VM or a Python VM. The VM is configured to interpret a bytecode file corresponding to each application. In an implementation, the VM can be a VM configured to execute a smart contract in a blockchain network, for example, an EVM VM, a WASM VM, or a solidity VM. An interpreter in the VM can be used to interpret a bytecode instruction stream generated through compiling by using a smart contract.

Based on the previous concept, in the method shown in FIG. 3, two registers are used to pre-obtain an analog function address. For ease of description, the two registers are referred to as a first register and a second register. The first register can be set to store an analog function address corresponding to a subsequent instruction, and the second register is set to store an analog function address corresponding to a current instruction. FIG. 3 shows method steps implemented in any instruction execution cycle. For clear and simple description, description is provided with reference to a case in which the nth instruction needs to be executed in the nth cycle. In this case, the nth instruction to be executed in the cycle is referred to as a current instruction. Herein, n>1. In addition, it should be understood that the current instruction and the subsequent instruction described in FIG. 3 and Table A in FIG. 2 are both operation code instructions, which are different from machine instructions directly executed by a processor.

As shown in FIG. 3, step 31: Read a first value stored in the first register, and determine validity of the first value. As described above, the first register is configured to store an analog function address corresponding to a subsequent instruction. Therefore, if the value stored in the first register is invalid, it indicates that acquisition of an address required for the nth instruction is invalid when the preceding (n−1)th instruction is executed. If the value stored in the first register is valid, it indicates that an address required for the nth instruction is successfully pre-obtained when the (n−1)th instruction is executed, and the first value is a function address required for the nth instruction. In an example, if the first value stored in the first register is zero, the value is an invalid value; otherwise, the value is a valid value. In another example, whether the value is a valid value can also be indicated by using another method. For example, a bit in the register is set to a status bit. The status bit is used to indicate whether a previous acquisition operation succeeds.

When the first value is a valid value, it indicates that the previous acquisition operation succeeds. Step 33: Store the first value in the second register. Therefore, the first value is stored in the second register, namely, the analog function address corresponding to the nth instruction, or a current analog function address corresponding to a current instruction. As such, instructions are updated in rounds or cycles. In this case, the first register can be used to store the function address required for the subsequent instruction, and the second register stores the function address of the current instruction.

Step 35: Obtain a subsequent analog function address corresponding to a subsequent instruction (the (n+1)th instruction) of the current nth instruction through accessing a memory, store the subsequent analog function address in the first register, and execute the current instruction based on the current analog function address read from the second register.

It can be seen that step 35 includes the operation of pre-obtaining a function address of a subsequent instruction and the operation of executing a current instruction. The following describes the operations separately.

The operation of pre-obtaining a function address of a subsequent instruction is first described. The operation is similar to a conventional process of obtaining an analog function address. The operation is still implemented through querying Table A and Table B shown in FIG. 2. The operation of pre-obtaining a function address of a subsequent instruction can include the following process:

An operation code corresponding to the subsequent instruction is first determined.

In an implementation, each instruction is an instruction with a predetermined fixed length. For example, as shown in FIG. 2, each instruction corresponds to an operation code, and a length of each instruction is one byte. In this case, the PC value of the PC accumulates by a value of a predetermined byte length to obtain a location number of the subsequent instruction. Then, the instruction sequence table, namely, Table A can be queried based on the location number to obtain the operation code corresponding to the subsequent instruction.

In another implementation, instructions included in an instruction stream have different lengths. For example, in a WASM bytecode, the bytecode is encoded by using leb 128. The leb 128 encoding is variable-length encoding. In this case, instructions have different lengths. First, an instruction length of a current instruction needs to be determined, and a PC value of a PC accumulates by the length of the instruction to obtain a location number of a subsequent instruction. Then, an instruction sequence table is queried based on the location number to obtain the operation code corresponding to the subsequent instruction.

After the operation code corresponding to the subsequent instruction is determined, the mapping table shown in Table B is queried to obtain an analog function address corresponding to the operation code. The analog function address serves as a subsequent analog function address.

The instruction sequence table A and the mapping table B are queried first in a cache. In cases of cache miss, the query is conducted by accessing a computer memory. The two tables are queried to obtain the subsequent analog function address corresponding to the subsequent instruction.

In an implementation, after the subsequent analog function is obtained, it is determined based on the address whether the corresponding subsequent analog function is loaded into the cache. If not, the subsequent analog function is loaded into the cache. As such, when the subsequent analog function is not loaded into the cache, the subsequent analog function can be loaded into the cache in advance, thereby reducing time consumed for accessing the computer memory when the subsequent instruction is executed, and further accelerating execution of the instruction.

The following describes the operation of executing a current instruction. The current analog function address has been transferred into the second register in step 33. Therefore, in step 35, the current analog function address is read from the second register, and the current analog function and the instruction code for implementing the analog function are obtained based on the address.

First, it is determined based on the analog function whether a sequence of executing the instruction stream changes due to the current instruction. In other words, it is determined whether the current instruction is a jump instruction. If yes, it indicates that the subsequent instruction may not be the instruction that is to be executed to update PC value in sequence. An error can occur to the acquisition of the address of the subsequent instruction. Therefore, the value in the first register is set to an invalid value. For example, the value is reset to zero, or the status bit is set to invalid. Then, the instruction code of the analog function corresponding to the current instruction is executed. If the current instruction is not a jump instruction, the instruction code of the analog function is directly executed.

In an example, the instruction code is a machine code that can be directly executed by the CPU. In this case, the machine code can be directly executed based on the machine code to execute the instruction corresponding to the current operation code. In another example, the instruction code is a code in a form closer to a machine instruction than a bytecode, for example, an assembly code. In this case, the instruction code can be converted into a machine code, so that the instruction corresponding to the current operation code is executed by executing the machine code.

As described above, step 35 includes the operation of pre-obtaining a function address of a subsequent instruction and the operation of executing a current instruction. In the acquisition operation, the analog function address can be obtained only by querying the mapping table, and the mapping table is stored in a cache or a computer memory. Therefore, the subsequent instruction address is pre-obtained still by accessing a memory (a cache or a computer memory). assume that it takes time T1 to pre-obtain the analog function address of the subsequent instruction. In addition, the current instruction is executed by executing a corresponding analog function, and the analog function generally corresponds to an instruction stream consisting of many machine instructions. Therefore, it takes longer time to execute the current instruction. The time is denoted as T2.

It can be understood that the time T2 for executing the current instruction is necessary. Therefore, it is expected that the execution time T1 required for pre-obtaining the subsequent instruction address can be "hidden", for example, "hidden" in T2, so that the acquisition operation occupies a minimum amount of time, thereby improving overall execution efficiency.

In an implementation, when step 35 is executed, the acquisition operation and the execution operation of the current instruction can be executed in parallel by different execution units (namely, processors) of the CPU, so that the acquisition operation does not take additional time. However, this is only applicable to a CPU with different execution units, for example, some multi-core CPUs.

In another implementation, a more general solution is used. To be specific, at a logical level of the interpreter, an acquisition operation is executed first, and then a current analog function is executed, while time of executing the acquisition operation is hidden through parallel execution of a plurality of machine instructions at an execution level of the processor.

Most current processors split machine instructions into smaller subprocesses by using a pipeline, and a plurality of subprocesses can be executed in parallel, thereby supporting parallel execution of a plurality of machine instructions. For the acquisition operation and the operation of executing a current analog function, both operations are converted to a series of machine instruction streams. The acquisition operation and the execution of the current analog function are not dependent on each other. so, when the acquisition operation is not completed, the processor performs subsequent machine instructions in parallel by following an dynamic (i.e., out-of-order) execution paradigm at a waiting interval required for some machine instructions (for example, waiting for accessing a cache or a computer memory). To be specific, the processor executes the current analog function, and then reorders a result of the out-of-order execution to obtain an execution result of the current analog function. Therefore, the two operations are executed in parallel. As such, the time T1 of the acquisition operation is hidden in the execution time T2 of the current analog function.

Therefore, when the current analog function is executed, the address of the subsequent analog function is successfully pre-obtained and stored in the first register. Then, the method in FIG. 3 is executed again to enter a subsequent round of instruction execution. A required address can be directly obtained from a register to execute an analog function. As such, the time of obtaining an analog function address from a memory is hidden or eliminated in each round of instruction execution process, thereby accelerating execution of the instruction.

However, the address acquisition can also fail. For example, as described above, a subsequent instruction determined in advance can be inaccurate if the current instruction is a jump instruction and a jump location needs to be determined based on an execution result of the current instruction. In this case, the value in the first register is set to an invalid value. This process corresponds to step 34 in FIG. 3. In other words, when the value in the first register is not a valid value, the current analog function address corresponding to the current instruction is obtained from the memory and stored in the second register. This process is equivalent to a process in which the previous round of speculative acquisition fails. In this round, the current analog function address of the current instruction is normally obtained by using a conventional method. In addition, the current analog function address is stored in the second register. Then, the previous step 35 is still performed to pre-obtain the subsequent instruction address, and the analog function of the current instruction is executed.

Figure 4:
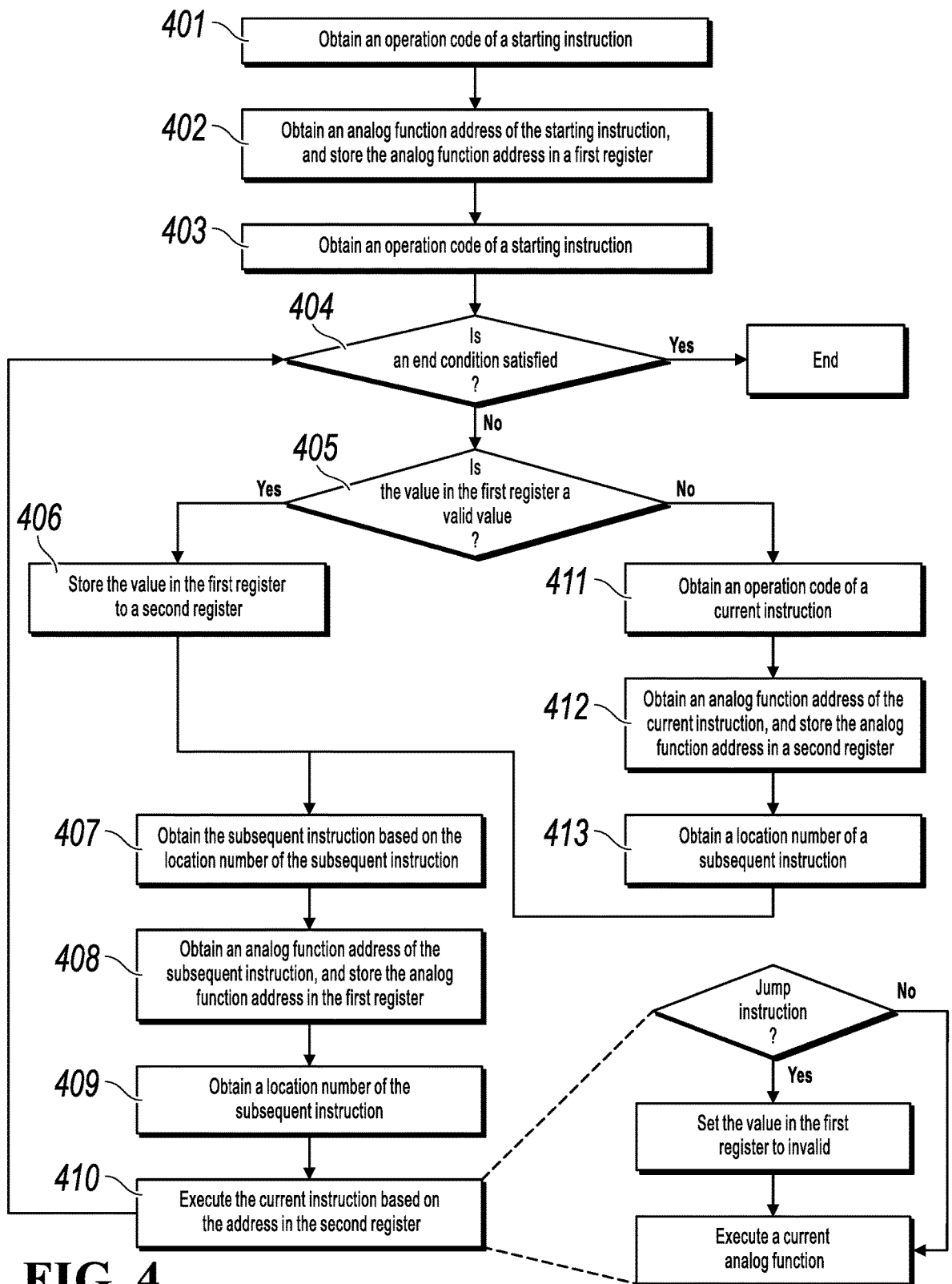
FIG. 4 is a schematic diagram illustrating an entire procedure of interpreting a bytecode instruction stream, according to an implementation.

FIG. 4 is a schematic diagram illustrating an entire procedure of interpreting a bytecode instruction stream, according to an implementation. The following describes the procedure shown in FIG. 4 with reference to the instruction sequence table shown in Table A in FIG. 2.

Step 401: Obtain an operation code of a starting instruction. Generally, the operation code of the starting instruction is obtained based on a predetermined entry location of the bytecode instruction stream, namely, an entry PC value. In the example of FIG. 2, assuming that the entry PC value is 100, the operation code of the starting instruction is 20.

Step 402: Obtain an analog function address corresponding to the starting instruction, and store the analog function address in the first register. In the example of FIG. 1, Table B can be queried based on the operation code 20 of the starting instruction to obtain an address of a corresponding analog function ADD function. It is assumed that the address is an address A. The address A is stored in the first register.

Step 403: Determine a location number of a subsequent instruction. When the instruction has a fixed length, assume that the PC value is updated to 108 and serves as the location number of the subsequent instruction.

Step 404: Determine whether an end condition is satisfied. The end condition can be set by using a plurality of methods, for example, the instruction stream is fully executed or overflowed.

If the end condition is not satisfied, step 405 is then performed. Step 405: Determine whether the value in the first register is a valid value. Because the valid value address A is stored in the current first register, the procedure proceeds to step 406. Step 406: Store the value in the first register to a second register. Therefore, the address A is stored in the second register.

Step 407: Obtain the subsequent instruction based on the location number of the subsequent instruction. Because the PC value is updated to 108 in step 403, the subsequent instruction can be obtained based on the location number, namely, an operation code 31.

Step 408: Obtain an analog function address corresponding to the subsequent instruction, and store the analog function address in the first register. In the previous example, a mapping table can be queried. As such, it can be learned that the operation code 31 of the subsequent instruction corresponds to a JMP function. Correspondingly, an address of the JMP function, namely, an address J, is stored in the first register. Therefore, the value in the first register is updated.

Step 409: Update the location number of the subsequent instruction again. In this case, the PC value is updated to 116.

Step 410: Execute an analog function corresponding to a current instruction based on the address in the second register. In other words, the ADD function is executed based on the previous address A.

As described above, in a CPU execution process, because steps 407 and 408 are not dependent on step 410, execution time of steps 407 and 408 can be accounted into an execution process of step 410 due to parallel execution of machine instructions.

After the ADD function corresponding to the first instruction is executed, the procedure returns to step 404. If the end condition is not satisfied, step 405 is then performed. Step 405: Determine whether the value in the first register is a valid value. Because the valid value address J is stored in the first register, the procedure proceeds to step 406. Step 406: Store the value in the first register to the second register.

Step 407: Obtain the subsequent instruction based on the location number of the subsequent instruction. Because the PC value is updated to 116 in step 409 in the previous procedure, the subsequent instruction can be obtained based on the location number, namely, an operation code 60.

Step 408: Obtain an analog function address corresponding to a subsequent instruction, and store the analog function address in the first register. Similarly, a mapping table can be queried. As such, it can be learned that the operation code 60 of the subsequent instruction corresponds to a PUSH function. Correspondingly, an address of the PUSH function, namely, an address P, is stored in the first register.

Step 409: Update the location number of the subsequent instruction again. In this case, the PC value is updated to 124.

Step 410: Execute the analog function JMP corresponding to the current instruction based on the address J in the second register. Assuming that the function is a condition jump function, a jump target is determined based on a value of a parameter in execution. In this case, when the analog function is executed, the value stored in the first register is first set to invalid. For example, the value in the first register is set to zero, or a status bit of the first register is set to invalid. In addition, the JMP function can be executed to determine the subsequent instruction to be executed. Assuming that the function is executed to determine to jump to an instruction at a location 132, the PC value is reset to 132.

The procedure returns to step 404 and proceeds to step 405. Step 405: Determine whether the value in the first register is a valid value. In this case, the first register has been cleared or set to invalid. Therefore, the result of determining of step 405 is that the value in the first register is not a valid value. Therefore, step 411 in another branch is performed.

Step 411: Obtain an operation code of a current instruction. Due to the jump operation, the PC is reset to 132. In this case, it can be learned that an operation code 10 at the location 132 is the operation code of the current instruction.

Step 412: Obtain a current analog function address of the current instruction, and store the analog function address in the second register. Afterwards, the mapping table is queried to obtain a MOVE function corresponding to the operation code 10, and an address M of the MOVE function is stored in the second register.

Step 413: Determine a location number of a subsequent instruction. Then, the PC value further accumulates and is updated to 140.

Steps 407 and 408 are executed again. An analog function address of the subsequent instruction is pre-obtained and then stored in the first register. Then, the PC value is further updated in step 409. In step 410, the current analog function Move is executed based on the address M stored in the second register.

This procedure is executed continuously until the end condition is satisfied.

It can be seen from the previous procedure that when instructions are executed in sequence, a branch starting from step 406 is executed. In this case, the address of the function to be executed can be obtained for the current instruction by reading the second register. Reading the register (requiring only one clock cycle) takes much less time than accessing a cache or a computer memory (tens of or even hundreds of clock cycles). In addition, as described above, time consumed for pre-obtaining a subsequent instruction function address is hidden in the execution of this instruction. No additional time is added. Therefore, an entire execution process is accelerated. The branch starting from step 411 needs to be executed only when there is a jump instruction and a sequence of executing an instruction stream changes. However, generally, jump instructions take up only a small part (about 20%) of total instructions. Therefore, a process of executing most instructions can be accelerated by using an acquisition method, thereby improving execution efficiency of the entire instruction stream.

Figure 5:
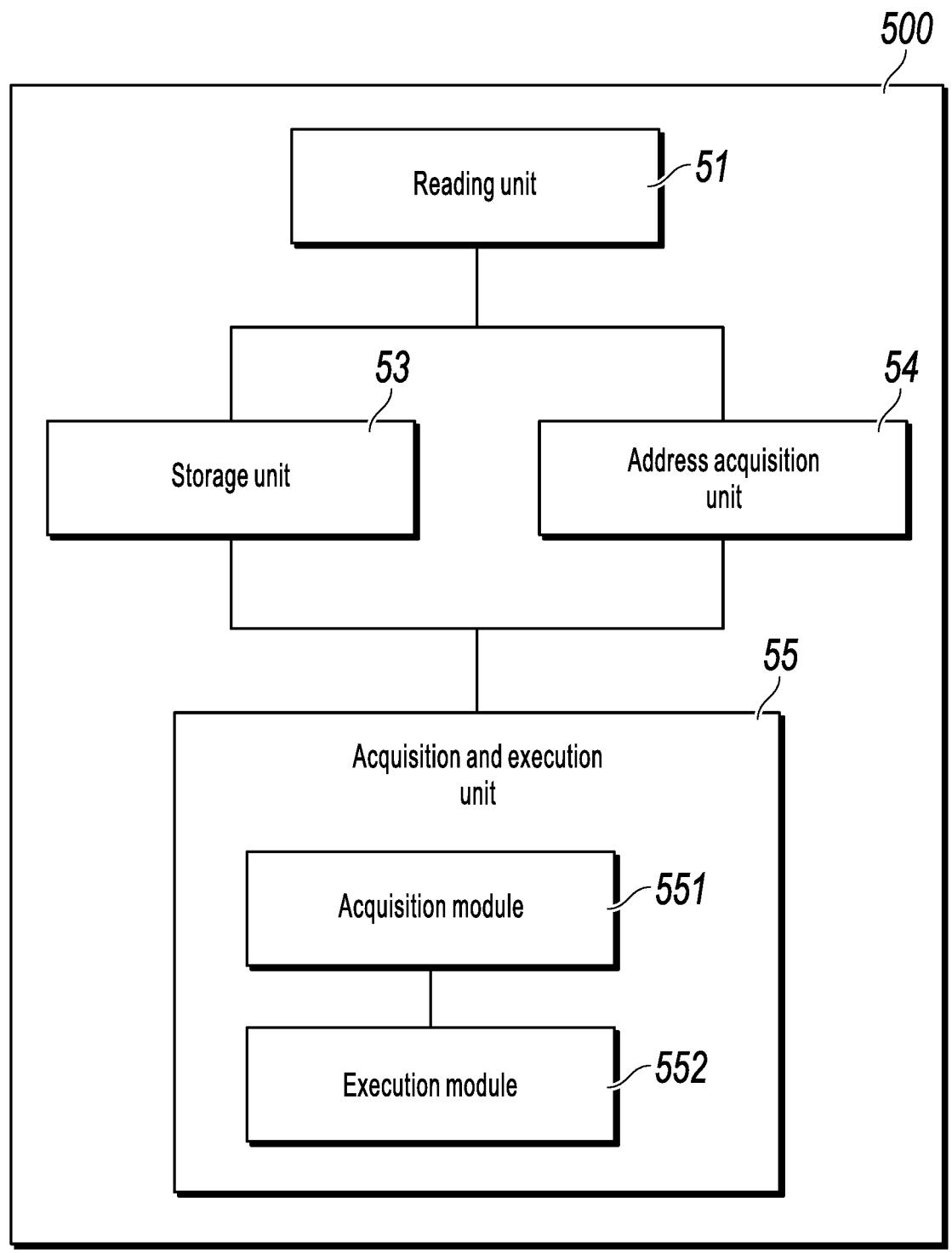
FIG. 5 is a schematic block diagram illustrating an apparatus for interpreting a bytecode instruction stream, according to an implementation.

In an implementation of another aspect, an apparatus for interpreting a bytecode instruction stream is provided. The apparatus is disposed in an interpreter of a VM. The VM can be disposed in any device, platform, or device cluster having computing and processing capabilities. FIG. 5 is a schematic block diagram illustrating an apparatus for interpreting a bytecode instruction stream, according to an implementation. As shown in FIG. 5, the apparatus 500 includes the following: a reading unit 51, configured to read a first value stored in a first register; a storage unit 53, configured to: when the first value is a valid value, store the first value in a second register, where the second register is configured to store a current analog function address corresponding to a current instruction in the bytecode instruction stream; and an acquisition and execution unit 55, configured to obtain, from a memory, a subsequent analog function address corresponding to a subsequent instruction of the current instruction, store the subsequent analog function address in the first register, and execute the current instruction based on the current analog function address read from the second register.

In an implementation, the apparatus 500 further includes an address acquisition unit 54, configured to: when the first value is not a valid value, obtain, from the memory, the current analog function address corresponding to the current instruction, and store the current analog function address in the second register.

In an implementation, the acquisition and execution unit 55 includes an acquisition module 551. The acquisition module 551 is configured to: determine an operation code corresponding to the subsequent instruction; and query a mapping table stored in the memory to obtain the analog function address corresponding to the operation code.

Further, in an implementation, the acquisition module 551 is further configured to: accumulate a PC value of a PC by a value of a predetermined byte length to obtain a location number of the subsequent instruction; and query, based on the location number, an instruction sequence table stored in the memory to obtain the operation code corresponding to the subsequent instruction.

In another implementation, the acquisition module 551 is further configured to: determine an instruction length of the current instruction; accumulate a PC value of a PC by the instruction length to obtain a location number of the subsequent instruction; and query, based on the location number, an instruction sequence table stored in the memory to obtain the operation code corresponding to the subsequent instruction.

In different implementations, the memory can be a cache or a computer memory. Correspondingly, the acquisition module 551 is configured to query at least one of the mapping table or the instruction sequence table in the cache; or conduct the query in the computer memory in cases of cache miss.

In an implementation, the acquisition and execution unit 55 includes an execution module 552. The execution module 552 is configured to: determine whether an instruction stream sequence changes due to the current instruction; and in response to that the instruction stream sequence changes due to the current instruction, set the value in the first register to an invalid value, and execute a current analog function corresponding to the current instruction; or in response to that the instruction stream sequence does not change due to the current instruction, directly execute a current analog function corresponding to the current instruction.

In an implementation, the acquisition and execution unit 55 is further configured to: determine, based on the subsequent analog function address, whether a subsequent analog function corresponding to the subsequent instruction is loaded into a cache; and in response to that the subsequent analog function corresponding to the subsequent instruction is not loaded into the cache, load the subsequent analog function into the cache.

In an implementation, the bytecode instruction stream is a bytecode instruction stream obtained through compiling by using a smart contract, and the virtual machine is a WASM VM or a solidity VM.

In an implementation of another aspect, a computer readable storage medium is further provided. A computer program is stored in the computer readable storage medium. When the computer program is executed in a computer, the computer is enabled to execute the method described with reference to FIG. 3 and FIG. 4.

In an implementation of another aspect, a computing device is further provided, including a memory and a processor. The memory stores an executable code. When the processor executes the executable code, the method described with reference to FIG. 3 and FIG. 4 is implemented.

A person skilled in the art should be aware that in the previous one or more examples, functions described in the present disclosure can be implemented by hardware, software, firmware, or any combination thereof. When the present disclosure is implemented by using software, the functions can be stored in a computer readable medium or transmitted as one or more instructions or codes in the computer readable medium.

The objectives, technical solutions, and benefits of the present disclosure are further described in detail in the described specific implementations. It should be understood that the above descriptions are merely specific implementations of the present disclosure, but are not intended to limit the protection scope of the present disclosure. Any modification, equivalent replacement, or improvement made within the spirit and principle of the present disclosure shall fall within the protection scope of the present disclosure.

What is claimed is:

1. A computer-implemented method for interpreting an instruction stream, the method comprising:
   receiving, by one or more processors of an interpreter of a virtual machine, an instruction stream comprising a plurality of machine instructions;
   reading, by the one or more processors, a first value stored in a first register corresponding to a current instruction of the plurality of machine instructions, the first value comprising a current analog function address;
   determining, by the one or more processors, that the first value is valid;
   in response to determining, by the one or more processors, that the first value is valid, storing the first value in a second register, wherein the second register is configured to store current analog function addresses corresponding to current instructions in the instruction stream;
   retrieving, by the one or more processors and from a memory, a subsequent analog function address corresponding to a subsequent instruction associated with the current instruction by using the current analog function address;
   storing, by the one or more processors, the subsequent analog function address in the first register; and
   executing, by the one or more processors, the current instruction based on the current analog function address read from the second register.

2. The computer-implemented method of claim 1, wherein the current instruction corresponding to the first value is different from a jump instruction.

3. The computer-implemented method of claim 1, wherein retrieving the subsequent analog function address comprises:
   determining an operation code corresponding to the subsequent instruction; and
   querying a mapping table stored in the memory to retrieve the subsequent analog function address corresponding to the operation code.

4. The computer-implemented method of claim 3, wherein determining the operation code corresponding to the subsequent instruction comprises:
   accumulating a program counter value of a program counter by a value of a predetermined byte length to obtain a location number of the subsequent instruction; and
   querying, based on the location number, an instruction sequence table stored in the memory to obtain the operation code corresponding to the subsequent instruction.

5. The computer-implemented method of claim 3, wherein determining the operation code corresponding to the subsequent instruction comprises:
   determining an instruction length of the current instruction;
   accumulating a program counter value of a program counter by the instruction length to obtain a location number of the subsequent instruction; and
   querying, based on the location number, an instruction sequence table stored in the memory to obtain the operation code corresponding to the subsequent instruction.

6. The computer-implemented method of claim 1, further comprising:
   determining, based on the subsequent analog function address, whether a subsequent analog function corresponding to the subsequent instruction is loaded into a cache; and
   in response to that the subsequent analog function corresponding to the subsequent instruction is not loaded into the cache, loading the subsequent analog function into the cache.

7. The computer-implemented method of claim 1, wherein the instruction stream comprises a bytecode instruction stream obtained through compiling by using a smart contract.

8. A non-transitory computer-readable medium storing one or more instructions executable by a computer system to perform operations for interpreting an instruction stream, the operations comprising:
   receiving an instruction stream comprising a plurality of machine instructions;
   reading a first value stored in a first register corresponding to a current instruction of the plurality of machine instructions, the first value comprising a current analog function address;
   determining that the first value is valid;
   in response to determining that the first value is valid, storing the first value in a second register, wherein the second register is configured to store current analog function addresses corresponding to current instructions in the instruction stream;
   retrieving, from a memory, a subsequent analog function address corresponding to a subsequent instruction associated with the current instruction by using the current analog function address;
   storing the subsequent analog function address in the first register; and
   executing the current instruction based on the current analog function address read from the second register.

9. The non-transitory computer-readable medium of claim 8, wherein the current instruction corresponding to the first value is different from a jump instruction.

10. The non-transitory computer-readable medium of claim 8, wherein retrieving the subsequent analog function address comprises:
    determining an operation code corresponding to the subsequent instruction; and
    querying a mapping table stored in the memory to retrieve the subsequent analog function address corresponding to the operation code.

11. The non-transitory computer-readable medium of claim 10, wherein determining the operation code corresponding to the subsequent instruction comprises:
    accumulating a program counter value of a program counter by a value of a predetermined byte length to obtain a location number of the subsequent instruction; and
    querying, based on the location number, an instruction sequence table stored in the memory to obtain the operation code corresponding to the subsequent instruction.

12. The non-transitory computer-readable medium of claim 10, wherein determining the operation code corresponding to the subsequent instruction comprises:
    determining an instruction length of the current instruction;
    accumulating a program counter value of a program counter by the instruction length to obtain a location number of the subsequent instruction; and querying, based on the location number, an instruction sequence table stored in the memory to obtain the operation code corresponding to the subsequent instruction.

13. The non-transitory computer-readable medium of claim 8, the operations further comprising:
determining, based on the subsequent analog function address, whether a subsequent analog function corresponding to the subsequent instruction is loaded into a cache; and
in response to that the subsequent analog function corresponding to the subsequent instruction is not loaded into the cache, loading the subsequent analog function into the cache.

14. The non-transitory computer-readable medium of claim 8, wherein the instruction stream comprises a bytecode instruction stream obtained through compiling by using a smart contract.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform operations for interpreting an instruction stream, the operations comprising:
receiving an instruction stream comprising a plurality of machine instructions;
reading a first value stored in a first register corresponding to a current instruction of the plurality of machine instructions, the first value comprising a current analog function address;
determining that the first value is valid;
in response to determining that the first value is valid, storing the first value in a second register, wherein the second register is configured to store current analog function addresses corresponding to current instructions in the instruction stream;
retrieving, from a memory, a subsequent analog function address corresponding to a subsequent instruction associated with the current instruction by using the current analog function address;
storing the subsequent analog function address in the first register; and
executing the current instruction based on the current analog function address read from the second register.

16. The computer-implemented system of claim 15, wherein the current instruction corresponding to the first value is different from a jump instruction.

17. The computer-implemented system of claim 15, wherein retrieving the subsequent analog function address comprises:
determining an operation code corresponding to the subsequent instruction; and
querying a mapping table stored in the memory to retrieve the subsequent analog function address corresponding to the operation code.

18. The computer-implemented system of claim 17, wherein determining the operation code corresponding to the subsequent instruction comprises:
accumulating a program counter value of a program counter by a value of a predetermined byte length to obtain a location number of the subsequent instruction; and
querying, based on the location number, an instruction sequence table stored in the memory to obtain the operation code corresponding to the subsequent instruction.

19. The computer-implemented system of claim 17, wherein determining the operation code corresponding to the subsequent instruction comprises:
determining an instruction length of the current instruction;
accumulating a program counter value of a program counter by the instruction length to obtain a location number of the subsequent instruction; and
querying, based on the location number, an instruction sequence table stored in the memory to obtain the operation code corresponding to the subsequent instruction.

20. The computer-implemented system of claim 15, the operations further comprising:
determining, based on the subsequent analog function address, whether a subsequent analog function corresponding to the subsequent instruction is loaded into a cache; and
in response to that the subsequent analog function corresponding to the subsequent instruction is not loaded into the cache, loading the subsequent analog function into the cache.

* * * * *